(12) United States Patent
Deng et al.

(10) Patent No.: US 6,845,020 B2
(45) Date of Patent: Jan. 18, 2005

(54) POWER CONVERTER SYSTEM

(75) Inventors: Duo Deng, Canton, MI (US); Dumitru D. Raceu, Warren, MI (US); Kent M. Harmon, Troy, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/453,920

(22) Filed: Jun. 2, 2003

(65) Prior Publication Data

US 2004/0027839 A1 Feb. 12, 2004

Related U.S. Application Data

(63) Continuation of application No. 09/710,145, filed on Nov. 10, 2000, now Pat. No. 6,603,672.

(51) Int. Cl.[7] .............................................. H02M 5/45
(52) U.S. Cl. ....................................................... 363/37
(58) Field of Search ............................. 363/34, 35, 37; 318/792–811

(56) References Cited

U.S. PATENT DOCUMENTS

| | | | |
|---|---|---|---|
| 4,788,485 A | 11/1988 | Kawagishi et al. | 318/811 |
| 4,855,652 A | 8/1989 | Yamashita et al. | 318/268 |
| 4,894,763 A | 1/1990 | Ngo | 363/35 |
| 5,155,671 A | * 10/1992 | Inaba et al. | 363/37 |
| 5,438,502 A | 8/1995 | Rozman et al. | 363/35 |
| 5,663,627 A | 9/1997 | Ogawa | 318/803 |
| 5,726,550 A | * 3/1998 | Inaniwa et al. | 318/803 |
| 5,742,493 A | * 4/1998 | Ito et al. | 363/37 |
| 6,160,722 A | 12/2000 | Thommes et al. | 363/37 |
| 6,185,115 B1 | * 2/2001 | Sul et al. | 363/37 |
| 6,239,997 B1 | 5/2001 | Deng | 363/95 |
| 6,275,392 B1 | 8/2001 | Streicher et al. | 363/35 |
| 6,314,007 B2 | 11/2001 | Johnson, Jr. et al. | 363/37 |

FOREIGN PATENT DOCUMENTS

| | | |
|---|---|---|
| EP | 0 265 867 A2 | 5/1988 |
| GB | 2 186 127 A | 8/1987 |
| GB | 2 206 006 A | 12/1988 |
| GB | 2 229 870 A | 10/1990 |
| WO | WO 97/25766 | 7/1997 |
| WO | WO 01/58000 A1 | 8/2001 |

* cited by examiner

Primary Examiner—Matthew V. Nguyen
(74) Attorney, Agent, or Firm—Seed IP Law Group PLLC

(57) ABSTRACT

A power conversion system which comprises a controller and conversion assemblies which selectively rectify and invert an electrical signal. Conversion assemblies comprise a plurality of integrated gate bipolar transistor assemblies. The power conversion system is effective to convert DC current to AC current, to convert AC current to DC current, and to control the output frequency of a received electrical signal to a conventional operating range.

30 Claims, 3 Drawing Sheets

POWER CONVERTER SYSTEM

This application is a continuation of Ser. No. 09/710,145 filed Nov. 10, 2000 U.S. Pat No. 6,603,672.

FIELD OF THE INVENTION

The present invention generally relates to a power converter system and more particularly, to a power converter system which efficiently and cost effectively converts diverse types of electric power signals to an electrical power signal having desired and predetermined characteristics.

BACKGROUND OF THE INVENTION

Deregulation of the electrical power industry has created competition among the various electrical utilities. However, while it is expected that such competition will eventually reduce the price of electricity, it has undesirably caused these electric utilities to reduce capital and maintenance spending in an effort to become more competitive. Particularly, such reduced maintenance spending has increased the number and length of power interruptions due to system and component failure, thereby causing the power to be unreliably provided.

Further, such reduced capital spending has prevented the creation of new electrical power generation facilities and together with the concomitant and relatively dramatic increase in electrical power consumption due to the growing use of computers and other devices and assemblies, has caused "blackouts" and interruptions due to consumption demands which far exceed the delivery capability of existing systems.

Attempts to address these difficulties include the use of diverse types of electrical generating systems which selectively provide power for individuals and/or small groups or communities in the event of such an interruption. While such "distributed generation" does reliably supplement the power provided by these utilities, it requires a relatively costly and complicated power conversion system which selectively converts the generated electrical power to a format which may be utilized by traditional and/or conventional devices.

There is therefore a need for a new and improved power conversion system which overcomes some or all of the previously delineated disadvantages of current power conversion systems.

SUMMARY OF THE INVENTION

A first advantage of the present invention is that it provides a power conversion system which uses a minimum number of devices to form a three phase power system.

A second advantage of the present invention is that it provides a power conversion system which, by way of example and without limitation, cost effectively receives an electrical power format and converts the received electrical power format to a predetermined format.

A third advantage of the present invention is that it provides a power conversion system which, by way of example and without limitation, allows various types of electrical power signals to be received and converted in a predetermined manner to supplement the electrical power for the grid or for users.

A fourth advantage of the present invention is that it provides a power conversion system which, by way of example and without limitation, operates in one of several modes including a first mode in which the power conversion system operates in parallel with the electrical power grid and a second mode in which the power conversion system operates in a "standalone" mode.

A fifth advantage of the present invention is that it provides a power conversion system which, by way of example and without limitation, allows power to flow in a variety of directions.

According to a first aspect of the present invention, a power conversion system is provided. The power conversion system includes first and second power conversion portions which can selectively be either a rectifier or an inverter.

According to a second aspect of the present invention, a method for directing and converting a first signal and a second signal into a desired format is provided. The method includes the steps of providing a power conversion assembly; receiving the second signal in a second portion of the power conversion assembly; rectifying the second signal in the second portion only when the power of the second signal travels through the power conversion assembly in a first direction; converting the power rectified from the second signal to a power with desired frequency and magnitude; causing the power with desired frequency and magnitude to be transferred in the first direction; receiving the first signal in a first portion of the power conversion assembly; rectifying the first signal in the first portion only when the power of the first signal travels through the power conversion assembly in a second direction; converting the direct current or "DC" power rectified from the first signal to an alternating current or "AC" power with a desired frequency and magnitude; and causing the "AC" power with a desired frequency and magnitude to be transferred in the second direction.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
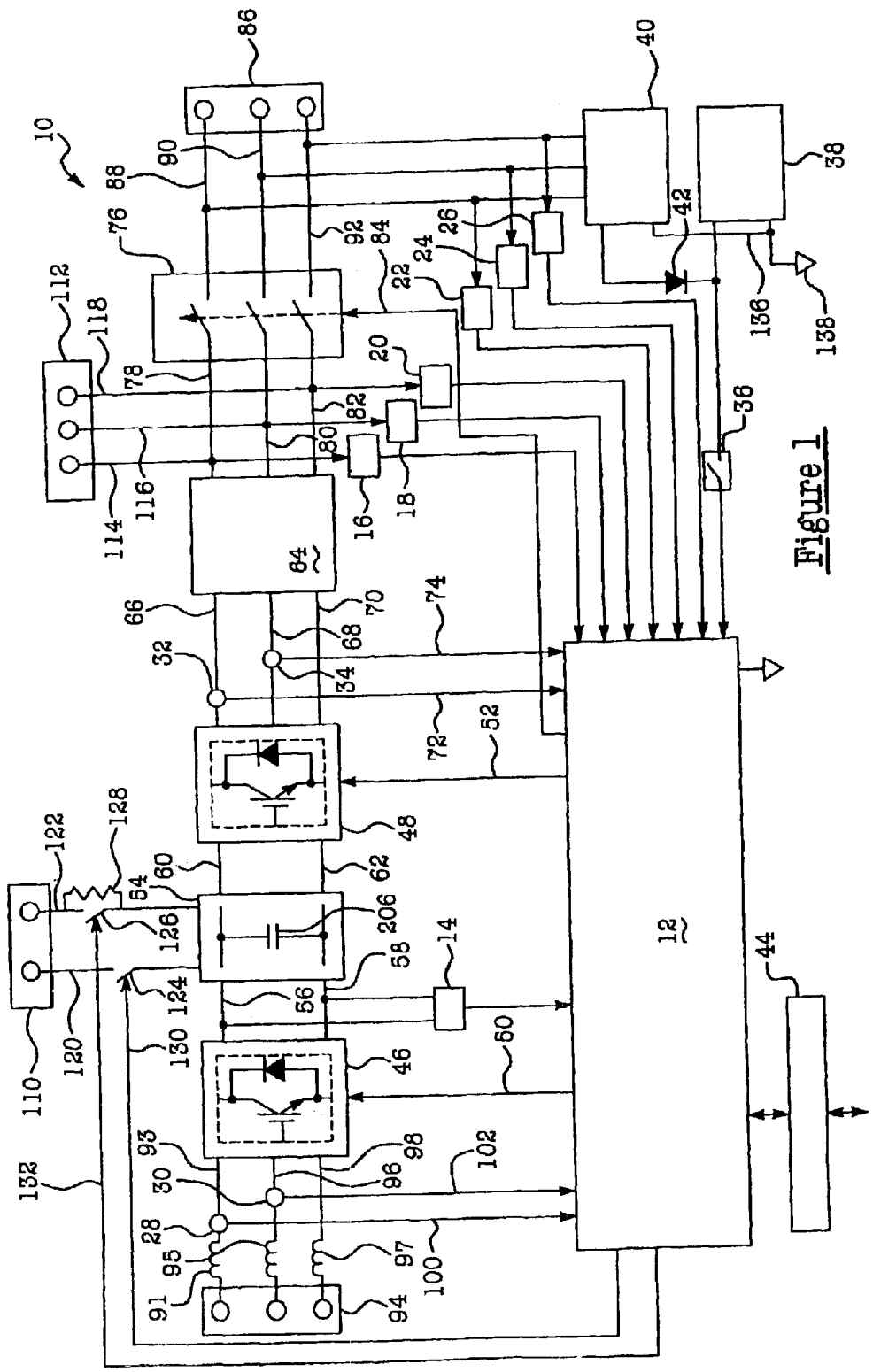
FIG. 1 is a block diagram of a power converter assembly which is made in accordance with the teachings of the preferred embodiment of the invention.

Referring now to FIG. 1, there is shown a power converter assembly 10 which is made in accordance with the teachings of the preferred embodiment of the invention.

As shown, power converter assembly 10 includes a controller 12, which is operable under stored program control, and voltage sensors 14, 16, 18, 20, 22, 24, and 26 which are physically and communicatively coupled to the controller 12. Assembly 10 further includes current sensors 28, 30, 32, and 34 which are also physically and communicatively coupled to the controller 12, a switch 36 which is physically and communicatively coupled to the controller 12, a battery 38 which is physically and conductively coupled to the switch 36, a control power assembly 40 (e.g., comprising a conventional power source) which is physically and conductively coupled to the switch 36 by the use of diode 42, and an input/output assembly 44 which is physically and communicatively coupled to the controller 12.

Assembly 10 further includes conversion assemblies 46, 48 which, in one non-limiting embodiment of the invention, are substantially identical and comprise integrated gate bipolar transistor ("IGBT") assemblies. Each of these conversion assemblies 46, 48 includes substantially identical numbers of IGBTs and each of these conversion assemblies 46, 48 is respectively, physically, and controllably coupled to the controller 12 through the gate drive busses 50, 52. Moreover, assembly 10 further includes a bus assembly 54 which is physically and communicatively coupled to the assembly 46 by the use of busses 56, 58 and which is physically and communicatively coupled to the assembly 48 by the use of busses 60, 62. Voltage sensor 14 is physically and communicatively coupled to the busses 56, 58.

Assembly 10 further includes a filter assembly 64 which is physically and communicatively coupled to the assembly 48 by the use of busses 66, 68, and 70. The current sensors 32 and 34 are physically and communicatively coupled to the busses 66 and 68 respectively, and are physically and communicatively coupled to the controller by respective busses 72, 74. Further, assembly 10 includes a switch assembly 76 which is physically and communicatively coupled to the filter assembly 64 by the use of busses 78, 80, and 82 and which is physically and controllably coupled to the controller 12 by the use of bus 84.

Assembly 10 further includes a first interface assembly 86 which is physically coupled to the switch assembly 76 by the use of busses 88, 90, and 92, and a second interface assembly 94 which is physically coupled to the assembly 46 by the use of busses 93, 96, and 98 and inductors 91, 95, and 97. Current sensors 28 and 30 are respectively, physically, and communicatively coupled to the busses 93 and 96 and the current sensors 28 and 30 are respectively, physically and communicatively coupled to the controller 12 by the use of busses 100 and 102. In one non-limiting embodiment of the invention, each of the interface assemblies 86 and 94 comprises a three phase wire connector assembly or device.

Figure 3:
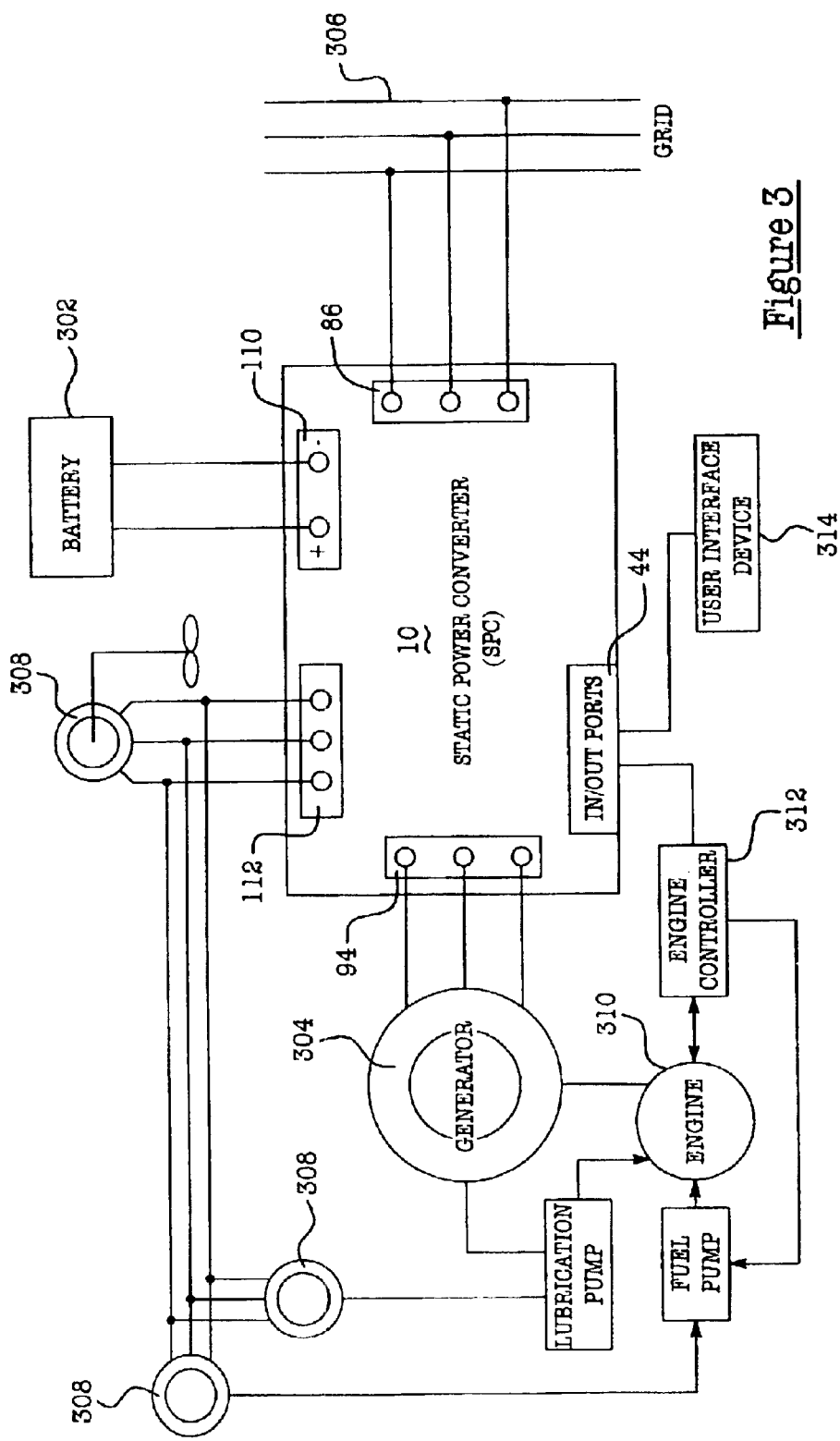
FIG. 3 is a block diagram of an example of an application of the power converter assembly which is shown in FIG. 1 in an engine driven generator case.

Assembly 10 also includes third and fourth interface assemblies or devices 110, 112. Particularly, interface assembly 112, in one non-limiting embodiment of the invention, is substantially similar to interface assemblies or devices 86, 94 and is physically coupled to the voltage sensors 16, 18, and 20 by the use of respective busses 114, 116, and 118. The interface assembly 110, in one non-limiting embodiment which is shown in FIG. 3, comprises a connector which is adapted to be attached to a high power direct current type of generator or "source" 302 such as a battery, fuel cell, and/or photovoltaic assembly. Moreover, the interface assembly 110 is coupled to the switches 124, 126 by use of respective busses 120, 122. Further, switches 124, 126 are connected to the controller 12 and the controller 12 selectively closes these switches 124, 126 by use of busses 130, 132. Resistor 128, which is coupled "across" the switch 126, is used to limit possible surging currents between a direct current type ("DC") power source attached at interface assembly 110 and the capacitor 206 attached on the DC busses 56, 58 at the initial time when the DC power source, applied to the DC bus 56, 58, is coupled to the switch 126 in an electrically parallel manner.

As is further shown, control power assembly 40 is physically and communicatively coupled to the battery 38 by the use of bus 136 and the bus 136 is coupled to electrical ground potential 138.

Figure 2:
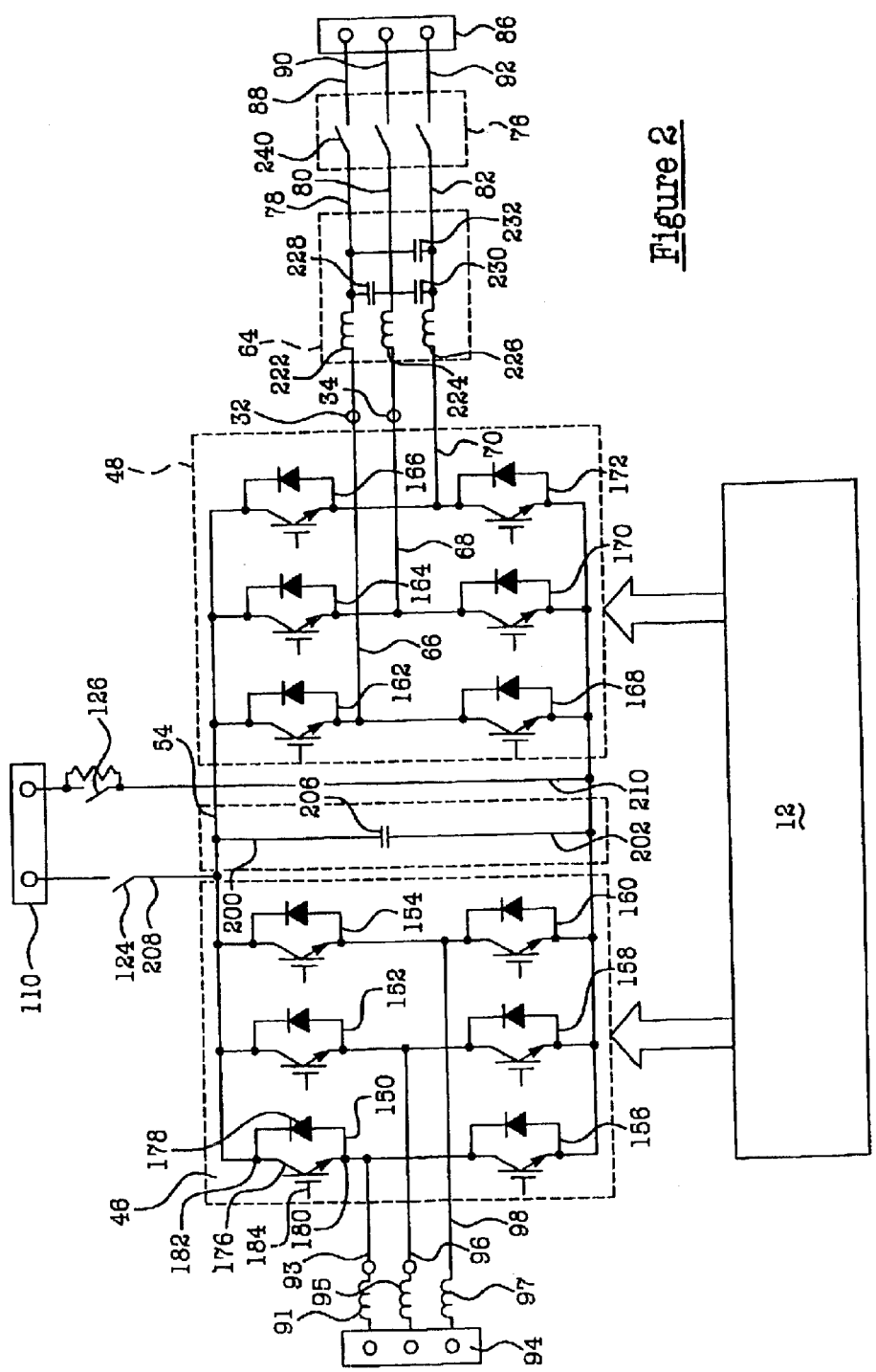
FIG. 2 is a schematic diagram of a portion of the power converter assembly which is shown in FIG. 1.

Referring now to FIG. 2, there is shown a schematic diagram of assemblies 46, 48, 54, 64, and 76. Particularly, each of the conversion assemblies 46, 48 respectively includes six IGBT assemblies 150, 152, 154, 156, 158, 160; and 162, 164, 166, 168, 170, and 172. Each of the IGBT assemblies 150–172 includes an integrated gate bipolar transistor 176 and a diode 178. Particularly, each of the transistors 176 has a diode 178 coupled to its respective emitter terminal 180 and collector terminal 182. The gate terminal 184 of each transistor 176 is physically and controllably coupled to the controller 12.

Further, in conversion assembly 46, the emitter terminal 180 of transistor 176 of the IGBT assembly 150 is physically and conductively coupled to the collector terminal 182 of the transistor 176 of the IGBT assembly 156 and these terminals 180 and 182 are physically and conductively coupled to bus 93. The emitter terminal 180 of the transistor 176 of the IGBT assembly 152 is physically and conductively coupled to the collector terminal 182 of the transistor 176 of the IGBT assembly 158 and these terminals 180 and 182 are physically and conductively coupled to bus 96. The emitter terminal 180 of the transistor 176 of the IGBT assembly 154 is physically and conductively coupled to the collector terminal 182 of the transistor 176 of the IGBT assembly 160 and these terminals 180 and 182 are physically and conductively coupled to the bus 98.

Further, as shown, bus assembly 54 includes a bus 200 which is physically coupled to the collector terminals 182 of the transistors 176 of each of the IGBT assemblies 150, 152, and 154. Bus assembly 54 further includes a second bus 202 which is conductively coupled to the first bus 200 by a capacitor 206 and which is physically and conductively coupled to the emitter terminals 180 of each of the transistors 176 of each of the IGBT assemblies 156, 158, and 160. Bus 200 and the collector terminals 182 of each of the transistors 176 of the IGBT assemblies 150, 152, and 154 are physically and conductively coupled to the switch 124 by the bus 208. The emitter terminals 180 of each of the transistors 176 of each of the IGBT assemblies 156, 158, and 160 are physically and conductively coupled to the switch 126 by the bus 210.

As is further shown in conversion assembly 48, each of the collector terminals 182 of each of the transistors 176 of each of the IGBT assemblies 162, 164, and 166 are physically and conductively coupled to the bus 208 and to the bus 200; and each of the emitter terminals 180 of each of the transistors 176 of each of the IGBT assemblies 168, 170, and 172 are physically and conductively coupled to the bus 210 and to the bus 202. The emitter terminal 180 of the transistor 176 of the IGBT assembly 162 is physically and conductively coupled to the collector terminal 182 of the transistor 176 of the IGBT assembly 168 and these terminals 180 and 182 are physically and conductively coupled to bus 66. The emitter terminal 180 of the transistor 176 of the IGBT assembly 164 is physically and conductively coupled to the collector terminal 182 of the transistor 176 of the IGBT assembly 170 and these terminals 180 and 182 are physically and conductively coupled to the bus 68. The emitter terminal 180 of the transistor 176 of the IGBT assembly 166 is physically and conductively coupled to the collector terminal 182 of the transistor 176 of the IGBT assembly 172 and these terminals 180 and 182 are physically and conductively coupled to the bus 70.

The filter 64, as shown best in FIG. 2, includes substantially identical inductors 222, 224, 226 which are respectively and physically coupled to the current sensors 32 and 34 and to bus 70. The filter 64 further includes capacitors 228 and 230 which are respectively and physically coupled to inductors 222 and 224 and to inductors 224 and 226. Filter 64 also includes a third capacitor 232 which is physically coupled to the busses 78 and 82. Capacitors 228, 230, and 232 may have a respective capacitance value which is determined by the amount of and/or type of harmonics present in the signal appearing upon the busses 66, 68, and 70 and inductors 222, 224, and 226 may similarly have a respective inductance value which is determined by the amount of and/or type of harmonics present within the signal appearing upon the busses 66, 68, and 70. Further, in one non-limiting embodiment of the invention, switch assembly 76 comprises a three element switch, each of the elements 240 being operatively and physically coupled to a unique one of the busses 78, 80, and 82 and which are further operatively, physically, and respectively coupled to busses 88, 90, and 92. In order to understand the usefulness of the assembly 10, several operational modes will now be explained in further detail.

Referring now to FIG. 3, which shows an application example of the invention assembly 10 in an engine driven generation case in a first mode of operation. Particularly, in this first mode of operation the power converter assembly 10 may be selectively used in an electrically parallel type of operation with an electrical power grid. In this mode, an "engine driven" AC generator 304 (i.e., the AC generator 304 is operatively coupled to an engine 310) may be connected at terminal 94 while the interface member 86 is operatively coupled to the electrical power grid 306, thereby allowing the grid 306 to provide electrical power to the control power assembly 40. The switch 36 is selectively moved to a closed position, allowing the power assembly 40 to provide electrical power to the controller 12. The controller 12 then disables the transistors 176 of each of the conversion assemblies 46 and 48 by disabling all of the respective gate terminals 184. The controller 12 then ascertains the value which is "read" by the voltage sensors 22, 24, and 26 in order to determine whether the "grid provided voltage" is within some predetermined and normal or conventional range.

If the grid provided voltage is within some predetermined range, the controller 12 causes the elements 240 of switch assembly 76 to be closed by placing a control signal onto bus 84. A cooling fan motor, pump, or other such assembly 308 may be selectively coupled to the interface member 112 and such an assembly may obtain electrical power from the grid through the busses 78, 80, and 82 which are physically and respectively connected to the busses 114, 116, and 118 (shown in FIG. 1), thereby allowing the cooling or lubricating motor connected to the assembly 112 to obtain power and to operate to cool the assembly 10 and/or cool and lubricate engine 310 and machine 304.

The conversion assembly 48 receives electrical power from the grid through the switch assembly 76, busses 78, 80, and 82, filter 64, and the busses 66, 68, and 70. In the case when the gate terminals 184 have been deactivated by the controller 12, the diodes 178 of the conversion assembly 48 cooperatively function as a three phase full bridge rectifier and cooperatively convert the received three phase alternating current type voltage into a direct current type voltage and communicates this rectified voltage upon the busses 60, 62 (200, 202). The inductors 222, 224, and 226 substantially prevent potentially harmful "energy spikes" from being communicated from the grid 306 to the assembly 48. In the case when the gate terminals 184 are activated, the devices 162–172 cooperatively act as an active rectifier and the assembly 48 can provide boosting direct current ("DC") type voltage upon the busses 200, 202 by applying pulse width modulation ("PWM") control signals on the respective gate terminals 184. The inductors 222, 224, 226 provide necessary energy for this desired boosting operation. In both of the rectification and the active rectification, the controller 12 monitors the voltage across the capacitor 206 by use of the voltage sensor 14 and when this monitored voltage exceeds a certain predetermined threshold value, the controller 12 enables each of the transistors 176 of the assembly 46. The controller 12 then creates and communicates pulse width modulated signals to each of the gate terminals 184 of each of the transistors 176 of the assembly 46, effective to cause the assembly 46 to generate variable frequency and variable magnitude alternating current type electrical power and to communicate the produced electrical power to the interface assembly 94. The inductors 91, 95, and 97 are used to substantially prevent high ripple current to flow into the machine 304. Particularly, an AC electrical generator or motor 304 (shown in FIG. 3) is attached to the assembly 94 and is placed upon a common shaft with an engine 310, thereby allowing the generator 304 to be selectively activated and to thereby rotate. When the common shaft reaches a certain predetermined speed, the engine 304 will be "fired" or activated by controller 12 through input/output assembly 44 which is communicatively coupled to the engine's controller 312. After a certain predetermined period of time or after the engine reaches a certain self-sustaining speed, the controller 12 disables the transistors 176 of the conversion assembly 46.

The controller 12 then causes each of the elements 240 of the switch assembly 76 to be opened. The engine 310 then drives the generator 304 to deliver three phase electrical power to the assembly 10. In the case when the transistors 176 of the assembly 46 are disabled, the assembly 46 functions as a three phase rectifier assembly which converts the alternating current type of three phase power, which is created by the generator 304, to direct current type of electrical power which is communicated to the busses 200 and 202. In the case when the transistors 176 of assembly 46 are activated, then the assembly 46 functions as an active rectifier and provides boosting and controlled DC bus voltage upon busses 200, 202. The inductors 91, 95, and 97 provide energy for boosting voltage operation.

The controller 12 then determines the voltage level which appears upon the capacitor 206 by the use of the voltage sensor 14. The controller 12 also determines whether the switch assembly 76 is in a fully opened state (e.g., all of the elements 240 are opened) by comparing the voltages obtained from sensors 16, 18, and 20 and comparing these voltages with those measured by sensors 22, 24, and 26 (e.g., there should be no voltage read from the sensors 16, 18, and 20). If the measured voltage across the capacitor 206 is above some predetermined threshold and the switch assembly 76 has an open status, the controller 12 activates the gate terminals 184 of each of the transistors 176 of the conversion assembly 48. Particularly, the controller 12 generates and communicates a pulse width modulated type signal to each of these gate terminals 184, effective to cause the conversion assembly 48 to convert the direct current type of voltage, appearing upon the busses 200 and 202, to a three phase type of alternating current type signal. The controller 12 then detects the voltages appearing upon busses 78, 80, and 82 by use of the voltage sensors 16, 18, and 20 and the voltages appearing on the busses 88, 90, and 92 by use of the voltage sensors 22, 24, and 26 and dynamically controls the voltage which appears upon the busses 78, 80, and 82 to be substantially identical to the voltage appearing on the busses 88, 90, and 92 which is provided by the electrical grid 306. Such control is achieved by the use of signals generated to the gate terminals 184 of the assembly 48 and may be referred to as "voltage control" signals and/or a "voltage control" operation. When these voltages are substantially equal to the grid voltage in phase and magnitude, the controller 12 then causes the switch assembly 76 to be fully closed, thereby allowing the assembly 10 to deliver electrical power to the electrical grid 306 and operate in an electrical parallel type of operation. Once the switch assembly 76 has been closed, in the manner just previously discussed, the controller 12 controls the amount of electrical current which is generated by the conversion assembly 48.

That is, the current sensors 32 and 34 are used by the controller 12 to detect the output currents from the conversion assembly 48. Closed loop type electrical current regulators may be used by and/or operatively placed within the controller 12 to cause the currents which are outputted from the assembly 48 to be within some predetermined range. This range or value may be remotely communicated to the controller 12 by use of the input/output port assembly 44. Further, it should be appreciated that the harmonic components of the output of the conversion assembly 48 are substantially eliminated and/or reduced by the filter 64. In the "startup stage" of the electrical motor/generator at terminal 94, the controller 12 desirably controls the output currents of the conversion assembly 46, by the use of current feedback control, to control the motor torque and protect against the occurrence of "motor over current". Hence, current sensors 28 and 30 are used to measure and communicate the actual motor currents to the controller 12 in order to allow the controller 12 to substantially prevent such an "over current" condition.

In a second mode of operation with an "engine driven" generator 304 at terminal 94, the assembly 10 may operate in a "standalone mode". In the initial stage of operation, the assembly 10 obtains electrical power from a direct current type power source 302 connected at terminal 110, such as from a battery, to energize or "start" an engine such as engine 310. After the engine 310 achieves "self-sustaining" operation, the assembly 10 converts the electrical power from an "engine driven" generator 304 at terminal 94 to a type of electrical power with desired frequency and voltage characteristics at terminal 86 (e.g., by way of example and without limitation an alternating current type of power). Therefore, the engine-generator and the assembly 10 cooperatively comprise a "standalone power source".

In this second mode of operation, the switch 36 is selectively moved to a "closed" position, effective to cause the controller 12 to receive electrical power from the battery 38. The controller 12 then closes the switch 124. A high voltage battery, fuel cell, or other such "DC" type power source 302 is operatively coupled to the interface assembly 110 and upon the closing of the switch 124, the capacitor 206 receives an electrical charge of the direct current type. The amount of electrical current which is communicated to the capacitor 206, through the busses 200, 202, is limited by the resistor 128.

When the amount of voltage reaches a certain predetermined amount, as measured by the voltage sensor 14, the controller 12 causes the switch 126 to occupy a closed position and the resistor 128 is electrically shorted to substantially avoid extra power dissipation. From this time, the controller 12 "enables" or activates the transistors 176 of the conversion assembly 48.

The controller 12 then generates and communicates a pulse width modulated signal to each of the gate terminals 184 of each of the transistors 176 of each of the IGBT assemblies 162, 164, 166, 168, 170, 172, effective to cause the assembly 48 to generate three phase alternating current type power and such power is communicated to the assembly 112 through the filter 64 and the busses 66, 68, 70, 114, 116, and 118. In this mode, as is best shown in FIG. 3, auxiliary devices 308, such as a pump and/or cooler motors are operatively coupled to the interface assembly 112 effective to allow the power to be communicated to these auxiliary devices 308, thereby allowing the auxiliary pump and/or motor to supply coolants to the assembly 10 and coolants and lubricant to the engine 310 and/or generator 304 which may be operatively coupled to the terminal 94 of the assembly 10.

After a predetermined time has elapsed, controller 12 activates the gate terminals 184 of each of the transistors 176 of the assembly 46. Particularly, the controller 12 generates and transmits pulse width modulated type signals to the gate terminals 184 of these transistors 176 of the assembly 46, effective to cause the direct current type of electrical power which is received from the interface assembly 110 to convert to a variable frequency and variable voltage type of alternating current type of electrical power signal in order to operatively drive and accelerate the electrical generator 304 which is operatively coupled to the interface assembly 94.

The electrical generator 304 then substantially functions as a motor and operatively "drives" the engine 310. When the common shaft speed of the engine 310 and the generator assembly 304 reaches a certain predetermined speed, the engine 310 is "fired" by the controller 12 through the engine's controller 312 and input/output assembly 44. After a predetermined amount of time has elapsed, the controller 12 receives a signal from the operating engine 310 which is substantially indicative of sustained operation. Upon receipt of this signal, the controller 12 disables the gate terminals 184 of the transistors 176 of the conversion assembly 46. The controller 12 then causes the switch assemblies 124 and 126 to be opened.

The engine 310 then drives the generator 304 to deliver three phase alternating current type of electrical power to the assembly 10. Since the gate terminals 184 of the transistors 176 of the assembly 46 are deactivated, the diodes 178 within the assembly 46 cooperatively provide three phase rectification which is effective to convert the three phase voltage signal which is generated from the engine/generator assembly to a direct current type of electrical power which is provided to the busses 200, 202. The conversion assembly 48 then converts the direct current type of electrical power which is present within the bus assembly 54 and upon the busses 200, 202 to alternating type of electrical power having a conventional magnitude and frequency. In one non-limiting embodiment of the invention, the controller 12 reduces the magnitude of the voltage of the assembly 48 in a "step down" manner but substantially leaves, as unchanged, the frequency of the produced electrical power signal. The controller 12 then closes the switch assembly 76 and after a certain predetermined amount of time has elapsed, the controller 12 raises the magnitude of the electrical power signal which is provided by the assembly 48 in a "slew up" fashion or manner. Such a "slew up" operation substantially prevents a current "spike" as the voltage signal is applied to the loads which may be selectively and operatively attached to the interface assembly 86.

Hence, as is more fully delineated above, in this second mode of operation, the controller 12 operatively controls the output frequency of the electrical power which is supplied by the conversion assembly 48 to be substantially equal to a conventional or "standard" operating range. The magnitude of the supplied voltage may vary according to the needs of the user and the desired magnitude may be communicated to the controller 12 by use of the user interface assembly 314. Particularly, the controller 12 dynamically controls the magnitude of the voltage being output from the assembly 48 by use of a voltage feedback control system. That is, voltage sensors 16, 18, and 20 operatively read the voltage levels which respectively "appear upon" busses 78, 80, and 82 and communicate these sensed voltage levels to the controller 12 in order to allow the controller 12 to dynamically modify these voltage levels in accordance with the measured values. The controller 12 also limits the level of the electrical currents which are provided by the conversion assembly 48 by the use of current sensors 32 and 34. That is, the current sensors 32, 34 respectively measure and communicate the amount of electrical current which "appear upon" busses 66 and 68, effective to allow the controller 12 to dynamically modify these electrical currents in a desired manner.

Further, the voltage and current signals which are produced by the assembly 48 include high harmonic frequency components due to the use of the previously delineated pulse width modulated signals. The filter 64 substantially removes these harmonics. Further, when the generator or motor 304 at terminal 94 is "started", the controller 12 controls the amplitude of the electrical current signals which are provided to the interface assembly 94 by the use of current feedback control. That is, the current sensors 28, 30 are used to measure the amount of electrical current which is supplied to the respective busses 93 and 96 and these sensors 28, 30 communicate these measured quantities to the controller 12 in order to allow the controller 12 to appropriately modify these current values. The inductors 91, 95, 97 are used to limit the high ripple current to flow into the machine 304. At the time that the engine 310 and generator assembly 304 provide electrical power to the bus assembly 54, the switches 124 and 126 may be selectively and controllably closed in order to supply electrical charge to the battery 302 which is operatively coupled to the interface member 110. Once the battery 302 has been charged through the bus assembly 54 and the switches 124, 126, the controller 12 may selectively open these switches 124, 126. The switches 124, 126 may be "ordered closed" by the use of a signal which is communicated to the controller 12 by the use of the input/output assembly 44 or may be selectively stored in program fashion within the controller 12. Further, in another non-limiting embodiment of the invention, the battery 38 may be selectively and electrically charged by the power source 40 that obtains power at the terminal 86 during the time that the power converter 10 is in a "standby" or grid mode. Diode 42 substantially blocks the flow of electrical power from the battery 38 to the power source 40.

In a third operational mode, electrical power may be received from the grid 306 through the use of interface assembly 94 and such electrical power may be used to provide electrical power to a user through the use of interface assembly 86. In this mode, the diodes 178 of the conversion assembly 46 cooperatively rectify the received electrical power and conversion assembly 48 converts DC power to AC power in the previously delineated manner, thereby allowing electrical power to be supplied to the user at the interface assembly 86. Further, in this mode, a "backup" power source, of the DC current type, may be employed and operatively coupled to the interface assembly 110 and to switches 124, 126 which are in a "closed" status in order to provide electrical power to the converter 10 in the event that the "grid supplied" power is interrupted. When the power which is provided by the grid 306 is interrupted the assembly 10 receives DC type power from interface assembly 110 and conversion assembly 48 converts the DC type power to AC type power by the use of pulse width modulated type signals at gates 184 of IGBT assemblies 162–172. This operation mode makes the power conversion system 10 useable as an uninterrupted power source ("UPS").

In other non-limiting modes of operation, electrical power signals may be received from interface assembly 110 and power is transferred to either interface assembly 94 and/or 86 in an inversion manner through the assemblies 46 and 48. AC type electrical power such as grid power, engine driven AC generated power, power which may be created by windmill generators and other generators and/or assemblies may also be received through interface assembly 94 and communicated, in a rectified, actively rectified, or a "DC to AC boosting manner" through assembly 46 and transferred to assembly 48 through bus assembly 54. Assembly 48 converts the received DC power to AC power and transfers the AC power to interface assembly 86 through assemblies 64 and 76. AC type electrical power may also be received through interface assembly 86 and communicated, in a rectified or actively rectified manner, through assembly 48, and the DC power is transferred to interface assembly 94 through assembly 46. In these most recently delineated modes, the AC type electrical power received through assembly 48, in a rectified or actively rectified manner, may also be converted to DC power upon DC busses 200, 202 and communicated to the interface assemblies 110 by the respective use of switches 124, 126.

Hence, it should be realized that the assembly 10 represents a universal configurable power conversion assembly which is adapted to be selectively utilized to convert the power provided by a diverse range of power generation devices and assemblies. The use of rectifiers 178 and transistors 176 within a single IGBT assembly 46, 48 allows the power converter assembly 10 to have a reduced number of power switches. Further, the relatively low inductance of the busses 200, 202 substantially prevents undesirable voltage spikes from occurring when the transistors 176 are operated in a "pulse width modulation mode". The sharing of the bus assembly 54 by the conversion assemblies 46 and 48 substantially reduces and/or substantially minimizes cost and allows the assembly 10 to be relatively lightweight.

It is to be understood that the invention is not limited to the exact construction, embodiment, and application example which has been previously disclosed, but that various changes, modifications, and/or applications may be made without departing from the spirit and the scope of the inventions as are delineated in the following claims.

What is claimed is:

1. A power converter, comprising:
   a first power conversion assembly comprising a number of switching transistors and a number of diodes, the switching transistors and the diodes electrically coupled in a first circuit configuration;
   a second power conversion assembly comprising a number of switching transistors and a number of diodes, the number of switching transistors and the number of diodes in the second power conversion assembly being equal to the number of switching transistors and the number of diodes in the first power conversion assembly, the switching transistors and the diodes electrically coupled in a second circuit configuration, the second circuit configuration being the same as the first circuit configuration;
   a power bus electrically coupling the first and the second power conversion assemblies;

at least one controller coupled to control at least one of the first and the second power conversion assemblies, wherein the first and the second circuit configurations are such that the first and the second power conversion assemblies are each operable as at least two of an AC to DC rectifier, a DC to AC inverter, and a DC to DC converter dependent on a set of control signals provided by the controller to control the operation of the switching transistors;

a first contactor assembly electrically coupled between a first interface assembly and the first power conversion assembly; and a second contactor assembly electrically coupled between a second interface assembly and the second power conversion assembly.

2. The power converter of claim 1, further comprising:

a first inductor assembly electrically coupled between the first contactor assembly and the first power conversion assembly; and a second inductor assembly electrically coupled between the second contactor assembly and the second power conversion assembly.

3. The power converter of claim 2, further comprising:

a first filter assembly electrically coupled between the first contactor assembly and the first inductor assembly; and a second filter assembly electrically coupled between the second contactor assembly and the second inductor assembly.

4. The power converter of claim 3, further comprising:

a first transformer electrically coupled between the first contactor assembly and the first filter assembly; and a second transformer electrically coupled between the second contactor assembly and the second filter assembly.

5. The power converter of claim 4, further comprising:

a first voltage sensor assembly electrically coupled between the first contactor assembly and the first transformer; and a second voltage sensor assembly electrically coupled between the second contactor assembly and the second transformer.

6. The power converter of claim 3 wherein the controller provides a first set of control signals to operate the first power conversion assembly as an AC to DC rectifier and a second set of control signals to operate the second power conversion assembly as a DC to AC inverter.

7. The power converter of claim 3 wherein the controller provides a first set of control signals to operate the first power conversion assembly as a DC to DC converter and a second set of control signals to operate the second power conversion assembly as a DC to AC inverter.

8. The power converter of claim 3 wherein the controller provides a first set of control signals to operate the first power conversion assembly as an active rectifier.

9. The power converter of claim 3 wherein the controller provides a first set of control signals to operate the first power conversion assembly as a passive rectifier.

10. A power converter, comprising:

a first interface assembly electrically couplable to at least one of a first load and a first source;

a second interface assembly electrically couplable to at least one of a second load and a second source;

a DC power bus;

a first power conversion assembly electrically coupled between the first interface assembly and the DC power bus, the first power conversion assembly comprising three switching assemblies, each of the switching assemblies comprising a pair of switching transistors and a pair of diodes, each of the diodes electrically coupled across a respective one of the switching transistors;

a second power conversion assembly electrically coupled between the second interface assembly and the DC power bus, the second power conversion assembly comprising three switching assemblies, each of the switching assemblies comprising a pair of switching transistors and a pair of diodes, each of the diodes electrically coupled across a respective one of the switching transistors; and at least one controller coupled to control operation of the switching transistors of at least one of the first and the second power conversion assemblies.

11. The power converter of claim 10, further comprising:

a first inductor assembly electrically coupled between the first interface assembly and the first power conversion assembly; and a second inductor assembly electrically coupled between the second interface assembly and the second power conversion assembly.

12. The power converter of claim 10, further comprising:

a first filter assembly electrically coupled between the first interface assembly and the first power conversion assembly; and a second filter assembly electrically coupled between the second interface assembly and the second power conversion assembly.

13. The power converter of claim 10, further comprising:

a first transformer electrically coupled between the first interface assembly and the first power conversion assembly; and a second transformer electrically coupled between the second interface assembly and the second power conversion assembly.

14. The power converter of claim 10, further comprising:

a first transformer electrically coupled between the first interface assembly and the first power conversion assembly;

a second transformer electrically coupled between the second interface assembly and the second power conversion assembly;

a first contactor assembly electrically coupled between the first interface assembly and the first transformer; and a second contactor assembly electrically coupled between the second interface assembly and the second transformer.

15. The power converter of claim 10, further comprising:

a first transformer electrically coupled between the first interface assembly and the first power conversion assembly;

a second transformer electrically coupled between the second interface assembly and the second power conversion assembly;

a first contactor assembly electrically coupled between the first interface assembly and the first transformer;

a second contactor assembly is electrically coupled between the second interface assembly and the second transformer;

a first voltage sensor assembly electrically coupled between the first transformer and the first contactor assembly; and a second voltage sensor assembly electrically coupled between the second transformer and the second contactor assembly.

16. The power converter of claim 10, further comprising:
a number of capacitors electrically coupled across the DC power bus between the first and the second power conversion assemblies.

17. The power converter of claim 10 wherein the first interface assembly comprises at least three terminals.

18. The power converter of claim 10, further comprising:
an energy storage device electrically couplable to the DC power bus to supply power thereto.

19. The power converter of claim 10, further comprising:
at least one internal load; and
a hotel power supply electrically couplable to the DC power bus to supply power therefrom to the at least one internal load.

20. The power converter of claim 10 wherein the first power conversion assembly is selectively operable by the controller alternatively as a passive rectifier and an active rectifier.

21. A power converter, comprising:
a first power conversion assembly comprising a number of switching transistors and a number of diodes, the switching transistors and the diodes electrically coupled in a first circuit configuration;
a second power conversion assembly comprising a number of switching transistors and a number of diodes, the switching transistors and the diodes electrically coupled in a second circuit configuration;
a power bus electrically coupling the first and the second power conversion assemblies; and
at least one controller coupled to control at least one of the first and the second power conversion assemblies;
a first contactor assembly operable to electrically couple the first power conversion assembly to a first one of a load and a source;
a second contactor assembly operable to electrically couple the second power conversion assembly to a second one of the load and the source;
a first transformer assembly electrically coupled between the first contactor assembly and the first power conversion assembly;
a second transformer assembly electrically coupled between the second contactor assembly and the second power conversion assembly.

22. The power converter of claim 21, further comprising:
a first voltage sensor assembly electrically coupled between the first contactor assembly and the first transformer assembly; and
a second voltage sensor assembly electrically coupled between the second contactor assembly and the second transformer assembly.

23. The power converter of claim 22 wherein the second circuit configuration is the same as the first circuit configuration.

24. A method of operating a first power conversion assembly and a second power conversion assembly electrically coupled to the first power conversion assembly, the method comprising:
providing a first power conversion assembly having a first electrical configuration and capable of operation as at least a rectifier and an inverter;
providing a second power conversion assembly having a second electrical configuration that matches the first electrical configuration and capable of operation as at least a rectifier and an inverter, the second power conversion assembly electrically coupled to the first power conversion assembly;
providing a controller coupled to control at least one of the first and the second power conversion assemblies;
at a first time, operating at least one of the first and the second power conversion assemblies as one of the rectifier and the inverter in response to a first set of control signals provided by the controller; and
at a second time, operating the at least one of the first and the second power conversion assemblies as the other one of the rectifier and the inverter in response to a second set of control signals provided by the controller.

25. The method of claim 24, further comprising:
providing a first set of instructions to provide signals to operate the first power conversion assembly as the rectifier at the first time.

26. The method of claim 24, further comprising:
providing a first set of instructions to provide signals to operate the first power conversion assembly as the inverter at the second time.

27. The method of claim 24, further comprising:
providing a first set of instructions to provide signals to operate the first power conversion assembly as the rectifier and to operate the second power conversion assembly as the inverter at the first time.

28. The method of claim 27, further comprising:
providing a second set of instructions to provide signals to operate the first power conversion assembly as the inverter and to operate the second power conversion assembly as the rectifier at the second time.

29. The method of claim 24, further comprising:
providing a first set of instructions to provide signals to operate the first power conversion assembly as the inverter and to operate the second power conversion assembly as the rectifier at the first time.

30. The method of claim 29, further comprising:
providing a second set of instructions to provide signals to operate the first power conversion assembly as the rectifier and to operate the second power conversion assembly as the inverter at the second time.

* * * * *